United States Patent [19]
Kronenberg et al.

[11] Patent Number: 5,703,370
[45] Date of Patent: Dec. 30, 1997

[54] METHOD AND APPARATUS FOR MEASURING ANGULAR DIFFERENTIAL DOSE OF IONIZING RADIATION

[75] Inventors: Stanley Kronenberg, Skillman; George J. Brucker, West Long Beach, both of N.J.

[73] Assignee: The United States of America as represented by the Secretary of the Army, Washington, D.C.

[21] Appl. No.: 816,821

[22] Filed: Mar. 18, 1997

[51] Int. Cl.⁶ ............................... G01T 1/02; G01T 1/14
[52] U.S. Cl. ............................... 250/376; 250/378
[58] Field of Search .................... 250/374, 376, 250/378, 336.1

[56] References Cited

U.S. PATENT DOCUMENTS

| | | | |
|---|---|---|---|
| 4,019,058 | 4/1977 | Kronenberg et al. | 250/376 |
| 4,136,282 | 1/1979 | Cox et al. | 250/336.1 |
| 4,697,084 | 9/1987 | Fox | 250/376 |
| 5,120,967 | 6/1992 | Cappelli et al. | 250/374 X |

Primary Examiner—Edward J. Glick
Attorney, Agent, or Firm—Michael Zelenka; George B. Tereschuk; William H. Anderson

[57] ABSTRACT

A sensor from a carbon fiber, self-reading electrometer type of dosimeter is made with a radically modified ionization chamber in order to determine the angular differential dose of ionizing radiation. The chamber is flat and its size is increased so that it is operable from intensities of 100 nGy(T) h$^{-1}$ to 10$^4$ Gy(T) h$^{-1}$. This performance range can be accomplished by the addition of capacitors to reduce the dosimeter's basic sensitivity. The capacitors should be connected in parallel between the electrometer assembly and ground. Additionally, the ionization chamber is lined, or in effect "sandwiched," between a low atomic number "low Z" material and a high atomic number "high Z" material. In one embodiment, a hermetically sealed plastic housing is lined on one surface with a lead (Pb) plate and the remainder of the housing is painted on the inside except the side with the lead plate) with a carbon paint. In so modifying the chamber, there will be a difference in the ionization effect coming from the lead side than from the low Z material side. By this difference in signal, one can determine the angular differential dose of radiation.

16 Claims, 6 Drawing Sheets

METHOD AND APPARATUS FOR MEASURING ANGULAR DIFFERENTIAL DOSE OF IONIZING RADIATION

GOVERNMENT INTEREST

The invention described herein may be manufactured, used, sold, imported, and/or licensed by or for the Government of the United States of America without the payment to us of any royalties thereon.

RELATED APPLICATION

The present application is related to co-pending U.S. patent application Ser. No. 08/687,095, filed Jul. 22, 1996, by the inventors herein and entitled, "Directional Radiation Detector and Imager."

FIELD OF INTEREST

This invention relates to the field of radiation dosimetery and more particularly to the novel field of angular differential dosimetery.

BACKGROUND OF THE INVENTION

Effects produced by ionizing radiation often depend not only on the dose but also on the direction or distribution of directions from which the dose is delivered to the target. In biological and medical applications, the effects in a body can depend on the direction of incident radiation. When a target significantly absorbs the incident radiation, the different regions of the target receive different doses, depending on the direction from where the dose is delivered. In solid state devices that consist of materials with different atomic numbers, the dependence of effects on the direction of incident gamma rays or x-rays can be significant due to the photo-Compton electrons and their distribution at interfaces of dissimilar materials. For general background information, see Wall et al, "Gamma dose distributions at and near the interface of different materials," *IEEE Trans. Nucl. Sci.*, Vol. NS-17; 305–309, December 1970; Frederickson et al, "Ionization, secondary emission, and Compton currents at gamma-irradiated interfaces," *IEEE Trans. Nucl. Sci.*, Vol. NS-18, 162–169, December 1971; Brucker et al, "Effects of package geometry, materials, and die design on energy dependence of P-MOS dosimeters," *IEEE Trans. Nucl. Sci.*, Vol. NS-42, No. 1, 33–40, February 1995.

One very important application for determining the direction and intensity of radiation doses and dose rates is in stereotactic radiosurgery and tomography. The use of stereotactic radiosurgery to render tissue, and particularly tumorous tissue, necrotic is well known. While the radiosurgical principle of confining radiation as much as possible only to a particular volume is particularly attractive, problems regarding the precision of stereotactic surgery remain an issue. With a risk that is proportional to both dose and the volume irradiated, radiation necrosis of tissue adjacent to a treated lesion remains the major complication of stereotactic radiosurgery. Particularly, concerns remain as to whether particular volumes of tissue receive too much or too little radiation according to the plan of treatment.

Typically, stereotactic radiosurgery is accomplished by taking an accurate three-dimensional model of the skull or other tumor bearing portion of the body from thin-cut CT scans so that the volume requiring treatment can be visualized in three dimensions. Then, a collimated radiation source is positioned in a sequence calculated to localize the energy deposition into a volume that, as closely as possible, conforms to that requiring treatment while avoiding exposure of nearby healthy tissue. Such a system and method for performing stereotactic surgery is disclosed in U.S. Pat. No. 5,207,223 issued to Adler on May 4, 1993, which is incorporated by reference herein. While this reference describes stereotactic radiosurgery in which the treatment volume is accurately defined by moving the gamma beam in precisely defined arcs about the center of that volume, under that system, the dose distribution is not defined or calibrated.

The dose distribution is an important parameter in stereotactic surgery. If a radiation dose were too low due to unforeseen conditions at a point intended to receive the maximum radiation, then the surgery could be ineffective. If a radiation dose were too high at a particular point in the tissue, the surgery might have negative effects. Whether fixed or frameless stereotactic radiosurgery is used, in order to determine if a particular scheme for the application of radiation beams to the tissue will result in a dose distribution within the prescribed limits and thereby optimize the treatment and minimize damage to healthy tissue, a system and method for such a determination is necessary. Such a system and method is described in U.S. Pat. No. 5,430,308, issued on Jul. 4, 1995 to Feichtner et al and entitled, "3-Dimensional Radiation Dosimeter," from which the foregoing background information was provided and which is incorporated herein by reference.

The Feichtner patent describes a system where reference data representative of said particular volume of tissue is stored in a computer memory. Such reference data is, for example, the result of a CT scan. The testing system includes an apparatus for the application of directable radiation to a stack of individual films. The stack of films occupy a particular volume intended to represent the tissue of a patient. The source of the radiation is programmed to focus the directable radiation onto a particular test volume according to the prescribed treatment. The films receive the focused radiation and thus become exposed.

The films are then individually removed from the stack and scanned by a scanner. The image output from the scanner is sent to the computer where a comparison is made between the reference data and the scanner output. The outcome of the comparison will provide valuable information with respect to target accuracy and dose distribution. Upon inspection of the comparison, adjustments can be made to the radiation output prior to its application to a living subject.

However, as is evident from Feichtner, there still exists a need in these arts to have a single device which can accurately determine the direction, dose and dose rate from various radiation sources, including the tissue or other object that has been exposed to radiation. The present invention addresses this need.

SUMMARY OF THE INVENTION

Accordingly, one object of the present invention is to provide a means to measure the angular differential dose of radiation absorbed from any one direction.

Another objective of the present invention is provide a means to improve methods through which radiation doses are delivered to patients.

Another objective of the present invention is to provide such a means in a simple, inexpensive device while still providing very accurate measurements of the direction, dose, and dose rate.

These and other objectives are accomplished by the present invention by fabricating a sensor from a carbon fiber, self-reading electrometer type of dosimeter with a radically modified ionization chamber. Carbon fiber, self reading electrometer type dosimeters are well known to those skilled in the art. Typically, these dosimeters include a charging switch which is connected to a carbon fiber electrometer. A microscope objective is disposed directly over the carbon fibers of the electrometer so that movement of the fibers can be readily seen across a read out scale through an occular lens, which is disposed on an opposite end of a plastic tube housing the microscope objective and read-out scale. The operation of such electrometer type dosimeters is described, for example, in U.S. Pat. No. 3,993,950, issued Nov. 23, 1976 to Piltingsrud, and entitled, "Carbon fiber electrometer for dosimeter", which is incorporated herein by reference.

Unlike these typical dosimeters, the ionization chamber according to the present invention through which the carbon fiber is exposed to radiation is drastically modified. In particular, the chamber size is increased so that it is operable from intensities of 100 nGy(T) h$^{-1}$ to 10$^4$ Gy(T) h$^{-1}$. This performance range can be accomplished by the addition of capacitors to reduce the dosimeter's basic sensitivity. The capacitors can be connected in parallel between the electrometer chamber and ground. Given the remainder of this disclosure, those skilled in the art will be able to devise any number of shapes and sizes for the chamber and therefore, no preferred dimensions will be recited in this Summary of the Invention.

Additionally, the ionization chamber is lined, or in effect "sandwiched," between a low atomic number "low Z" material and a high atomic number "high Z" material. In one embodiment, a hermetically sealed plastic housing is lined on one surface with a lead (Pb) plate and the remainder of the tissue equivalent, plastic housing is painted on the inside (except the side with the lead plate) with a carbon paint. In so modifying the chamber, the device will act similarly to the invention described in co-pending U.S. patent application Ser. No. 08/687,095, filed Jul. 22, 1996, by the inventors herein and entitled, "Directional Radiation Detector and Imager," which is incorporated herein by reference; however, the present invention will be able to calculate the differential dose from a radiation source. In the co-pending patent application, a planar detector, (e.g. a layer of scintillator) which is thin compared with the applicable ranges of the photo-Compton electrons, is sandwiched between plates of low and high Z (atomic number) materials. For quantum energies of gamma rays greater than 0.6 MeV, the number of electrons emitted from the surfaces of the two layers into the detector is greater when the gamma rays enter through the low Z-layer than when they enter through the high Z-layer. For lower quantum energies the emission effect is reversed, but the incident gamma rays are attenuated more by the high Z-layer than the low Z-layer. Thus, the signal is again greater when the gamma rays enter through the low Z-material as compared to the signal when the gamma rays enter through the high Z-layer. By this difference in signal, one can determine the direction of the radiation source.

Therefore, by modifying the chamber in this way, the distribution of directions of the dose can be easily determined and by using the increased sensitivity of the electrometer type dosimeter, dose and dose rates for applications such as stereotactic radiosurgery can also be easily determined. This is because radiation induced effects often depend not only on the dose, but also on the distribution of directions from which it is delivered and thus, the distribution of the dose can be described by using the angular differential dose whose integral over all angles equals the dose. The directional sensor according to the present invention can measure these quantities. Its sensitivity to the direction of incident gamma rays or x-rays makes it possible to measure dose or dose rate as a function of the angle of incident radiation.

Experiments were conducted to demonstrate the properties of the sensor according to the present invention using point sources of $^{137}$Cs. The results, which will be explained in the Detailed Description of the invention, show that the sensor can detect and locate multiple $^{137}$Cs sources and determine the angular differential dose or dose rate in physical units of nGrays (Tissue) per degree or per degree per min. The directional dosimeter according to the present invention was also used to scan and image the back-scatter from a water target of cesium 662 keV gamma rays. These results will also be discussed.

BRIEF DESCRIPTION OF THE DRAWINGS

These and other features of the invention will be understood in light of the ensuing Detailed Description of the Invention and the attached Figures, wherein.

DETAILED DESCRIPTION OF THE INVENTION

Figure 1:
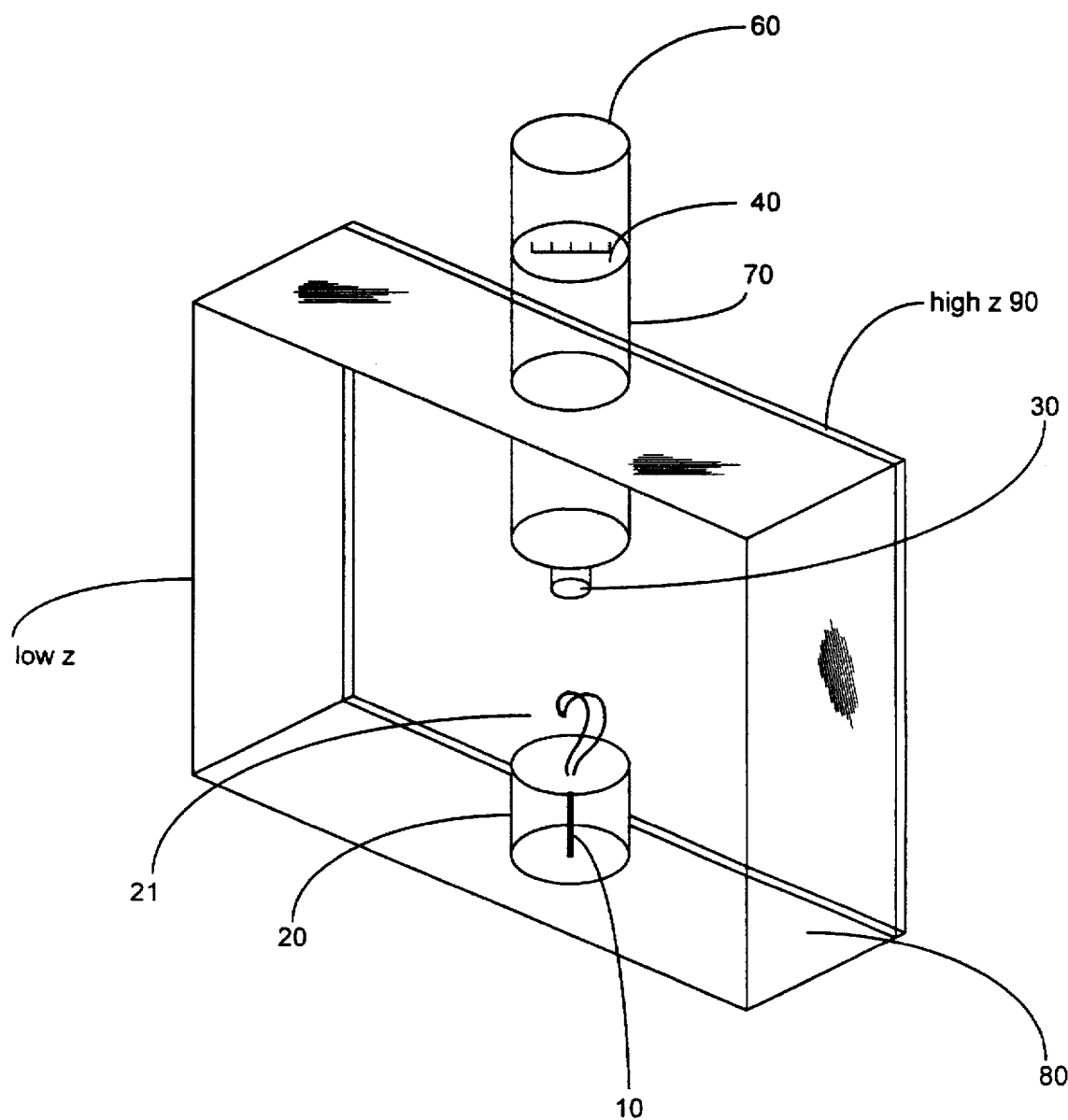
FIG. 1 is an illustration of one preferred embodiment of the directional differential dosimeter according to the present invention.

Now referring to FIG. 1, there is shown a directional dosimeter according to one embodiment of the present invention. As shown, the directional dosimeter is fabricated from some of the typical elements found in an carbon fiber, electrometer type dosimeter. Carbon fiber, self reading electrometer type dosimeters are well known to those skilled in the art. Typically, these dosimeters include a charging switch 10 which is connected to a carbon fiber electrometer 20. The carbon fiber electrometer preferably has an insulator made from Cerex™ 250. A microscope objective 30 is disposed directly over the carbon fibers 21 of the electrometer so that movement of the fibers 21 can be readily seen across a read out scale 40 through an occular lens 60, which is disposed on an opposite end of a plastic tube housing 70 the microscope objective 30 and read-out scale 40. The operation of such electrometer type dosimeters is described in U.S. Pat. No. 3,993,950, issued Nov. 23, 1976 to Piltingsrud, and entitled, "Carbon fiber electrometer for dosimeter", which is incorporated herein by reference. Because the operation of electrometer type dosimeters is so well known, their operation and additional functional elements do not need to be described further.

Unlike any prior art dosimeters, the ionization chamber 80 through which the carbon fiber 21 is electrically discharged when exposed to radiation is drastically modified according to the present invention. In particular, the ionization chamber size is increased so that it is operable from intensities of 100 nGy(T) h$^{-1}$ to $10^4$ Gy(T) h$^{-1}$. This performance range can be achieved by the addition of capacitors to reduce the dosimeter's basic sensitivity. The capacitors should be connected in parallel between the electrometer dosimeter and ground. Given the remainder of this disclosure those skilled in the art will be able to devise any number of shapes and sizes for the chamber. However, the ionization chamber of a directional dosimeter, which was fabricated by the inventors herein and which was used in the experiments described infra, had a height of 52 mm, a length of 73 mm, and a depth of 28 mm.

In addition to increasing the sensitivity of the dosimeter, the ionization chamber 80 according to the present invention is, in effect, "sandwiched" between a low atomic number "low Z" material and a high atomic number "high Z" material. In one embodiment, a hermetically sealed plastic housing forms the ionization chamber and is lined on one surface (a 52 mm×73 mm surface) with a lead (Pb) plate 90 and the remainder of the housing is painted on the inside (except the side with the lead plate) with a carbon paint. In so modifying the chamber, the device will act similar to the invention described in co-pending U.S. patent application Ser. No. 08/687,095, filed Jul. 22, 1996, by the inventors herein and entitled, "Directional Radiation Detector and Imager," which is incorporated herein by reference. In that application, a planar detector, (e.g. a layer of scintillator) which is thin compared with the applicable ranges of the photo-Compton electrons, is sandwiched between plates of low and high Z (atomic number) materials. For quantum energies of gamma rays greater than 0.6 MeV, the number of electrons emitted from the surfaces of the two layers into the detector is greater when the gamma rays enter through the low Z-layer than when they enter through the high Z-layer. For lower quantum energies the emission effect is reversed, but now the incident gamma rays are attenuated more by the high Z-layer than the low Z-layer. Thus, the signal is again greater when the gamma rays enter through the low Z-material as compared to the signal when the gamma rays enter through the high Z-layer. By this difference in signal one can determine the direction of a radiation source.

Therefore, as will be described, by modifying the chamber in this way, the direction of the dose can be determined and by using the increased sensitivity of the electrometer type dosimeter, angular differential dose and dose rates for application like stereotactic radiosurgery can also be easily determined.

This is because radiation induced effects often depend not only on the dose but also on the distribution of directions from which it is delivered and thus, the distribution of the dose can be described by using the angular differential dose whose integral over all angles equals the dose. The directional sensor according to the present invention can measure these quantities. Its sensitivity to the direction of incident gamma rays or x-rays makes it possible to measure dose or dose rate as a function of the angle of incident radiation.

To facilitate the work where radiation effects may depend on the angular distribution of the delivered dose and to describe the radiation environment in a scientifically defined manner, the present invention makes the concept of the angular differential dose practical. This quantity, $D_\phi$, shall be defined for a two dimensional geometry where the sources of radiation and the point of interest are located on a plane as:

$$D = \int_{\phi=0}^{2\pi} D_\phi(\phi) d\phi$$

where D is the dose in grays (e.g. grays (tissue) or grays (Si)) and the units of $D\phi$ are grays per radian. For a spherical distribution of sources, $D_{\phi\theta}$ is defined in an analogous manner as:

$$D = \int_{\phi=0}^{2\pi} \int_{\theta=0}^{\pi} D_{\phi\theta}(\phi\theta) d\phi d\theta$$

where the units of $D_{\phi\theta}(\phi\theta)$ can be expressed as grays per steradian.

For a parallel beam of incident radiation $D_\phi$ is a delta function whose integral is defined as D and in the case of isotropic radiation $D_\phi$ is a constant. Similar definitions can be formulated for angular differential dose rate:

with $$(dD/dt)_\phi = D_\phi(\phi).$$

For sources distributed on a plane:

$$D = \int_{\phi=0}^{2\pi} D_\phi(\phi) d\phi.$$

From this it is evident that to measure the angular differential dose, directional sensors are required. One prior art approach was to use collimators combined with some type of detector which scans the radiation field. This approach posed several problems. For example, collimators with a large angle of acceptance have necessarily, a poor angular resolution and those with high angular resolution have a small angle of acceptance. In addition, collimators fail completely when more than one point source is present because normalization of more than one delta function can not be properly carried out. However, using the present invention any number of sensors will lend themselves very well to measuring $D_\phi$. These sensors will have a $4\pi$ solid angle of acceptance and simultaneously, high angular resolution that is limited only by the accuracy of the measurement of the angle.

An angular resolution of approximately one second of arc was demonstrated experimentally by the present invention. Therefore, gamma ray and x-ray directional sensors according to the present invention can scan and generate one dimensional images of broad and point sources of radiation. The detector part of the sensors is based on different approaches that depend on the sensitivity required to make a specific measurement. As described above, an ionization chamber was used in the electrometer type dosimeter, but for purposes of the present invention other types of devices can also be line/sandwiched according to the present invention. These include Geiger-Mueller tubes, scintillation counters, and solid state detectors. All of these types of devices will provide the capability of measuring the angular differential dose at a wide range of intensities.

These sensors will produce response functions that look like step functions when the detectors were rotated in the fields of gamma ray or x-ray photons generated by point sources and the incident radiation is parallel to the surfaces of the layers. As described in the co-pending patent application listed above, the first derivative of the output of a scintillator sensor versus angle is proportional to the incident intensity versus angle, thus, it is proportional to $D_\phi$.

To express the output in correct units, for example, grays per degree, the output function of the sensor must be normalized. To accomplish this, the sensor output that is the integral of the angular differential dose rate taken between its maximum (i.e. $\phi=0°$) and its minimum (i. e. $\phi=180°$) must be made equal to the dose obtained from an independent measurement made at the location of the sensor with a dosimeter calibrated in the desired units, e.g. grays(tissue) (hereafter grays(T)).

In order to better understand the impact of the present invention, the experiments performed by the inventors on the device described in reference to FIG. 1 will be explained.

MEASUREMENTS OF $D_\phi$

A. Scanning Two Point Sources

Figure 2:
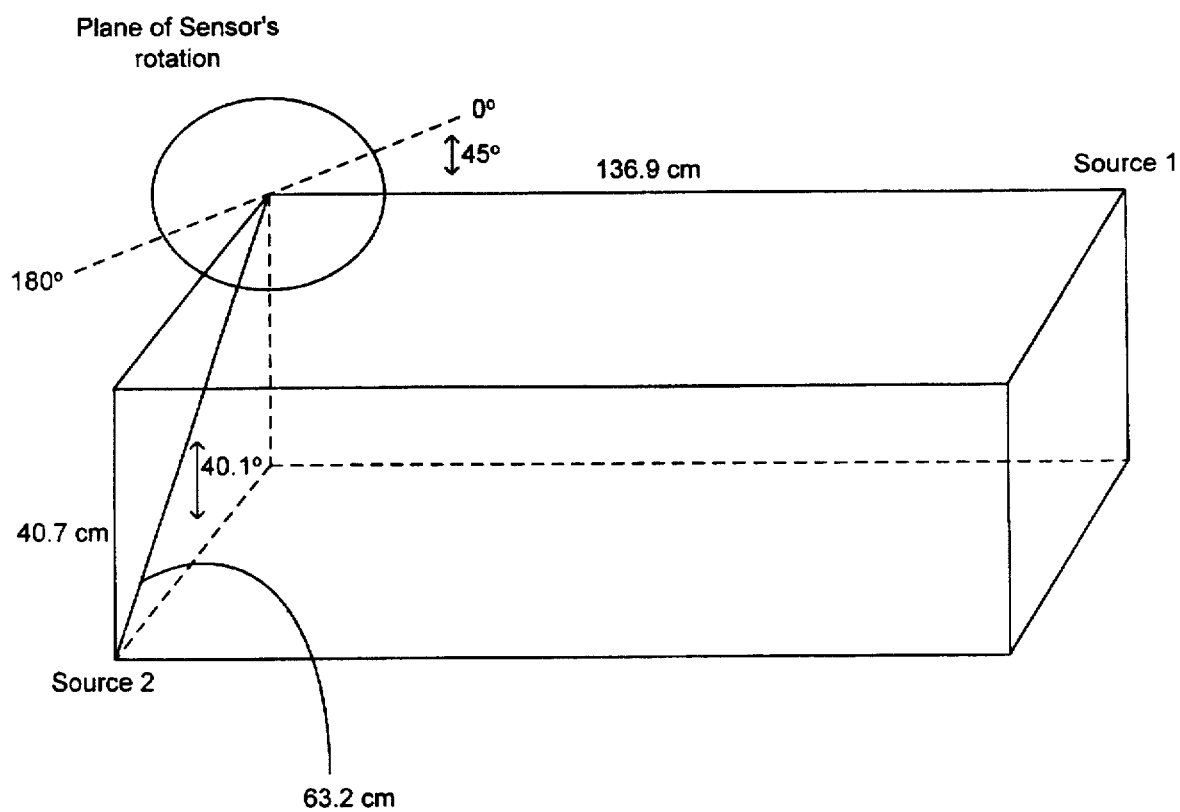
FIG. 2 is an illustration of the experimental setup for scanning the radiation from two $^{137}$Cs sources with the dosimeter of FIG. 1.

Two sources of cesium were arranged to irradiate the directional dosimeter according to the present invention from different locations and planes relative to the detector. FIG. 2 is an illustration of the experimental setup for scanning the radiation from two $^{137}$Cs sources with the dosimeter of FIG. 1. The exposure time was 1.0 minute. Sensor scans were made for an angular range of 0° to 360° with the detector rotating on the horizontal plane. The dose at the detector per one minute exposure was measured by a special 20 µGy(T) full scale, self-reading dosimeter constructed in a similar manner to the directional dosimeter described above except there was no lead in the ionization chamber and it was cylindrically shaped with a chamber diameter and height of 5.1 cm. This device was calibrated by Shonka-Wychoff air ionization chambers traceable to NIST (National Institute of Standards and Technology). The dose rates of the two sources at the detector location were source #1=12.5 µGy (T)min$^{-1}$ and source #2=7.02 µGy(T)min$^{-1}$.

Figure 3:
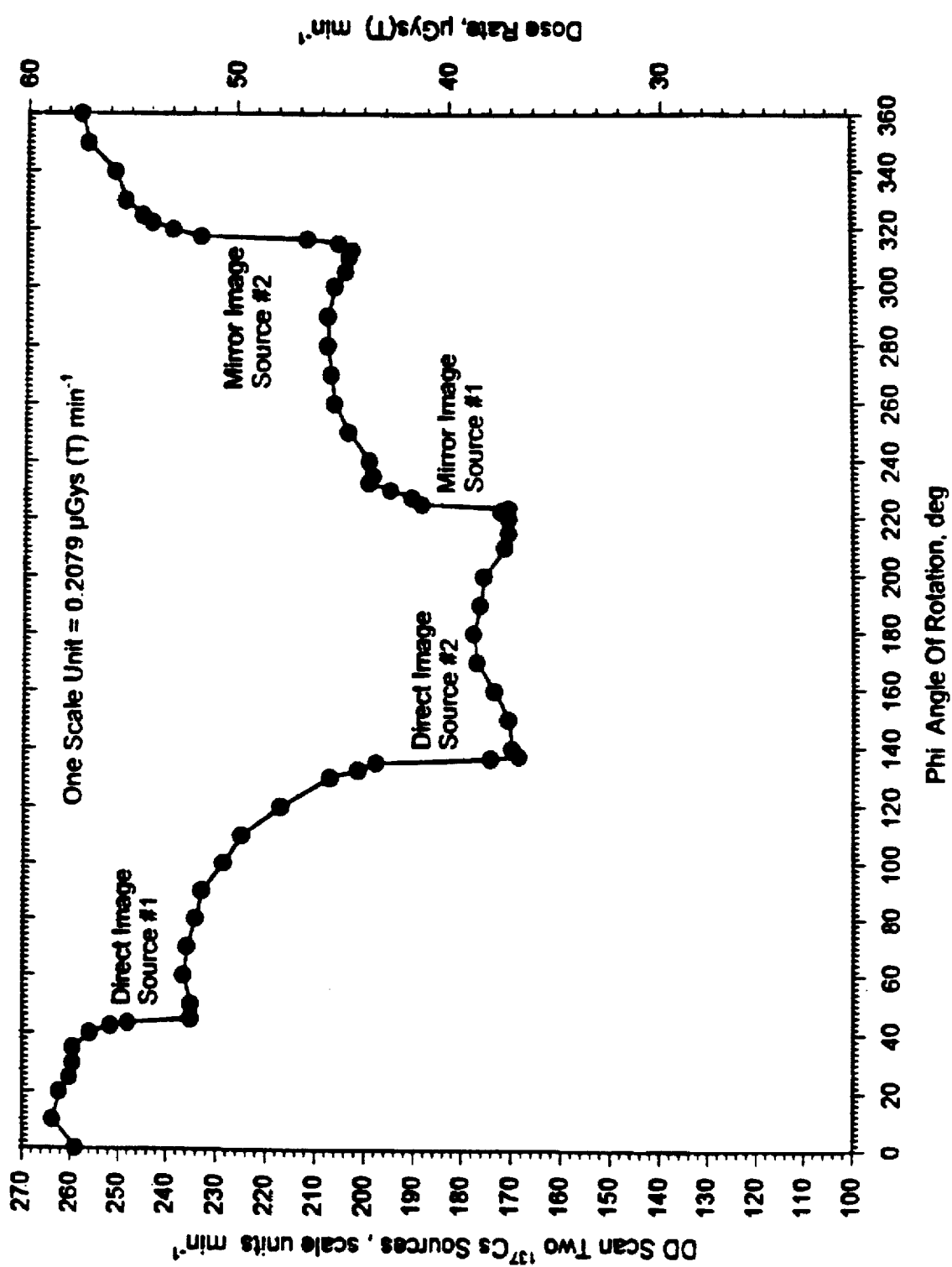
FIG. 3 is a graphical illustration of the scan results showing the present invention's responses as a function of $^{137}$Cs gamma ray incident angles for the range of 0° to 360°, wherein the direct and mirror images representing each of the two source locations are indicated in the plot.

FIG. 3 shows the mean values of two independent scans generated by the directional dosimeter. Specifically, FIG. 3 is a graphical illustration of the scan results showing the present invention's responses as a function of $^{137}$Cs gamma ray incident angles for the range of 0° to 360°, wherein the direct and mirror images representing each of the two source locations are indicated in the plot. As stated above, to convert the arbitrary scale readings min$^{-1}$ of the directional dosimeter to units of grays(T) min$^{-1}$, the difference in the maximum and minimum scale readings of the sensor response (range of angles from 0° to 180°) in FIG. 3, namely, 95 scale units min$^{-1}$ were set equal to the 20 µgray full scale tissue equivalent dosimeter measurement of 19.75 µGy(T)min$^{-1}$. This yielded a calibration factor of 208 nGy per scale reading per min. The left hand y-axis in FIG. 3 is in arbitrary scale units/min whereas the right hand y-axis is in µGys/min.

Figure 4:
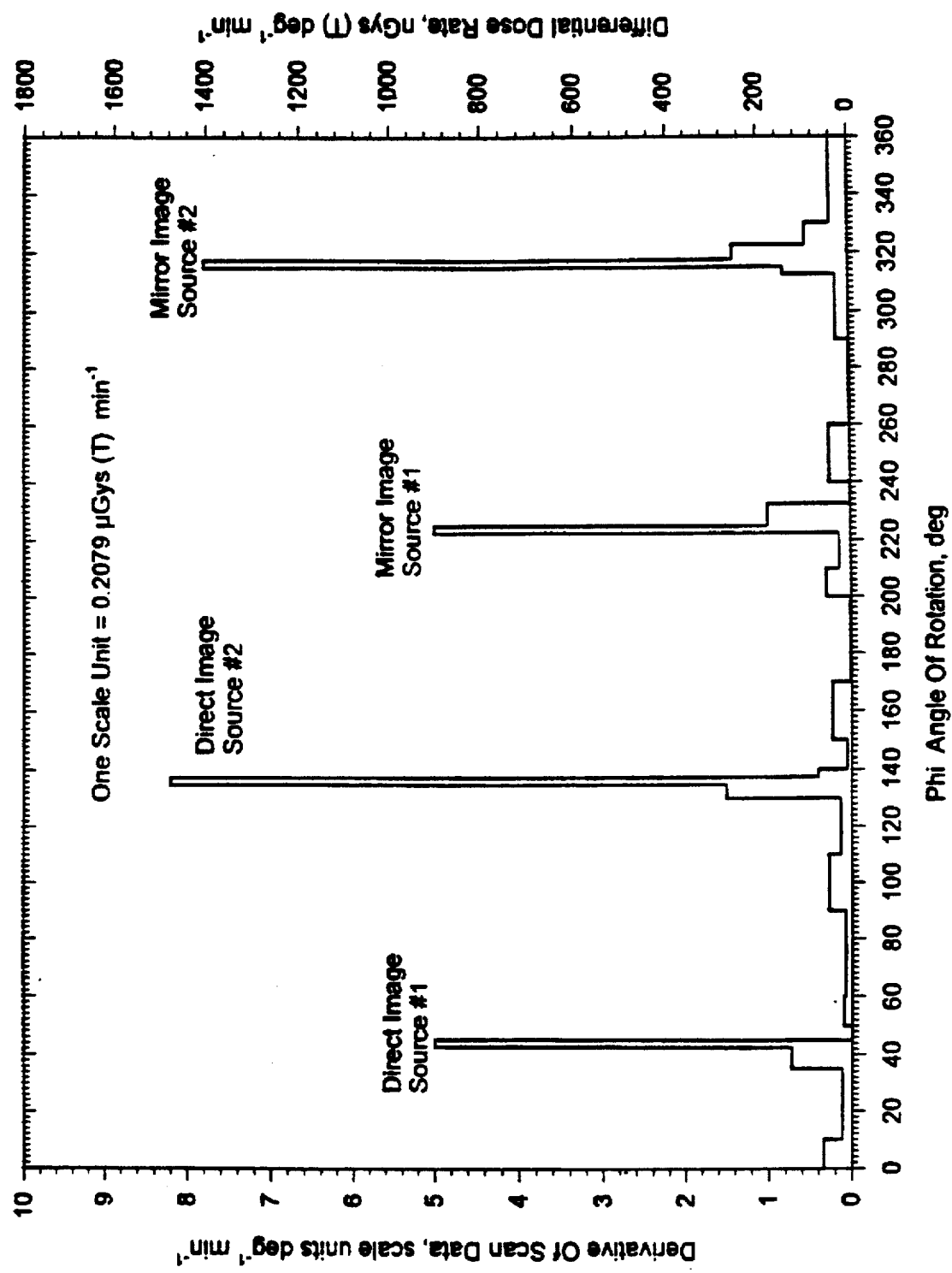
FIG. 4 graphically illustrates the derivatives of the scan data of FIG. 3 as a function of radiation incident angles (These derivatives represent the angular differential dose rate measured by the sensor. Normalization of the directional dosimeter's arbitrary scale units to physical units of nanoGrays (Tissue) deg$^{-1}$ min$^{-1}$ is indicated by the right hand y-axis of the plot)

FIG. 4 graphically illustrates the derivatives of the scan data of FIG. 3 as a function of radiation incident angles. These derivatives represent the angular differential dose rate measured by the sensor. Normalization of the directional dosimeter's arbitrary scale units to physical units of nanoGy (tissue) deg$^{-1}$ min$^{-1}$ is indicated by the right hand y-axis of the plot. Application of the calibration factor to the derivative data in FIG. 4, yields the desired angular differential dose in nGy(T) per degree per min as shown by the right hand y-axis units in FIG. 4.

As discussed in co-pending patent application, the directional sensor produces two types of images, namely, a direct image and what is referred to as a mirror image of each source due to the direction of rotation and the different signals generated by the front and back edges of the sensor. Thus, in this experiment, a total of four images were generated in the 0° to 360° scan. That patent application also shows how both the scan data and the derivatives of the scan data yield the angular locations of the sources being scanned. Consequently, the plot in FIG. 4 shows that source 1 was located at 43.7° and source 2 at 136.25° and similarly, the mirror images yield corresponding values of 223.65°−180°=43.65° and 136.25°, respectively. Similar source locations can also be deduced from the four transition regions in the scan data shown in FIG. 3. The excellent agreement between the two sets of angles is strong verification of the measurements of the angular distribution.

B. Scanning $^{137}$Cs Gamma Ray Back-Scatter From Water Target

Figure 5:
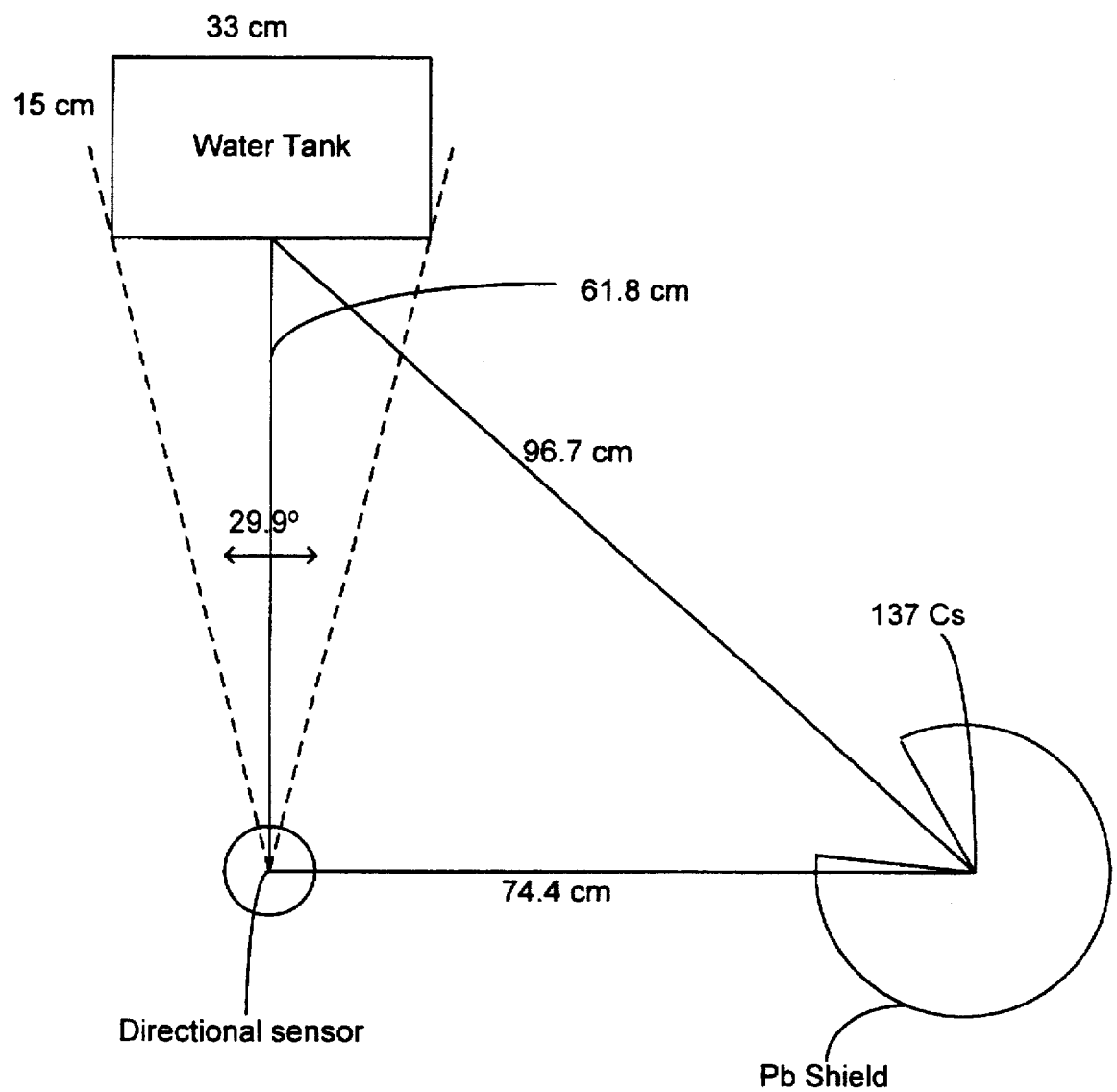
FIG. 5 is an illustration of another experimental setup for a scan of back-scattered $^{137}$Cs gamma rays from polyethylene container of water using the present invention.
Figure 6:
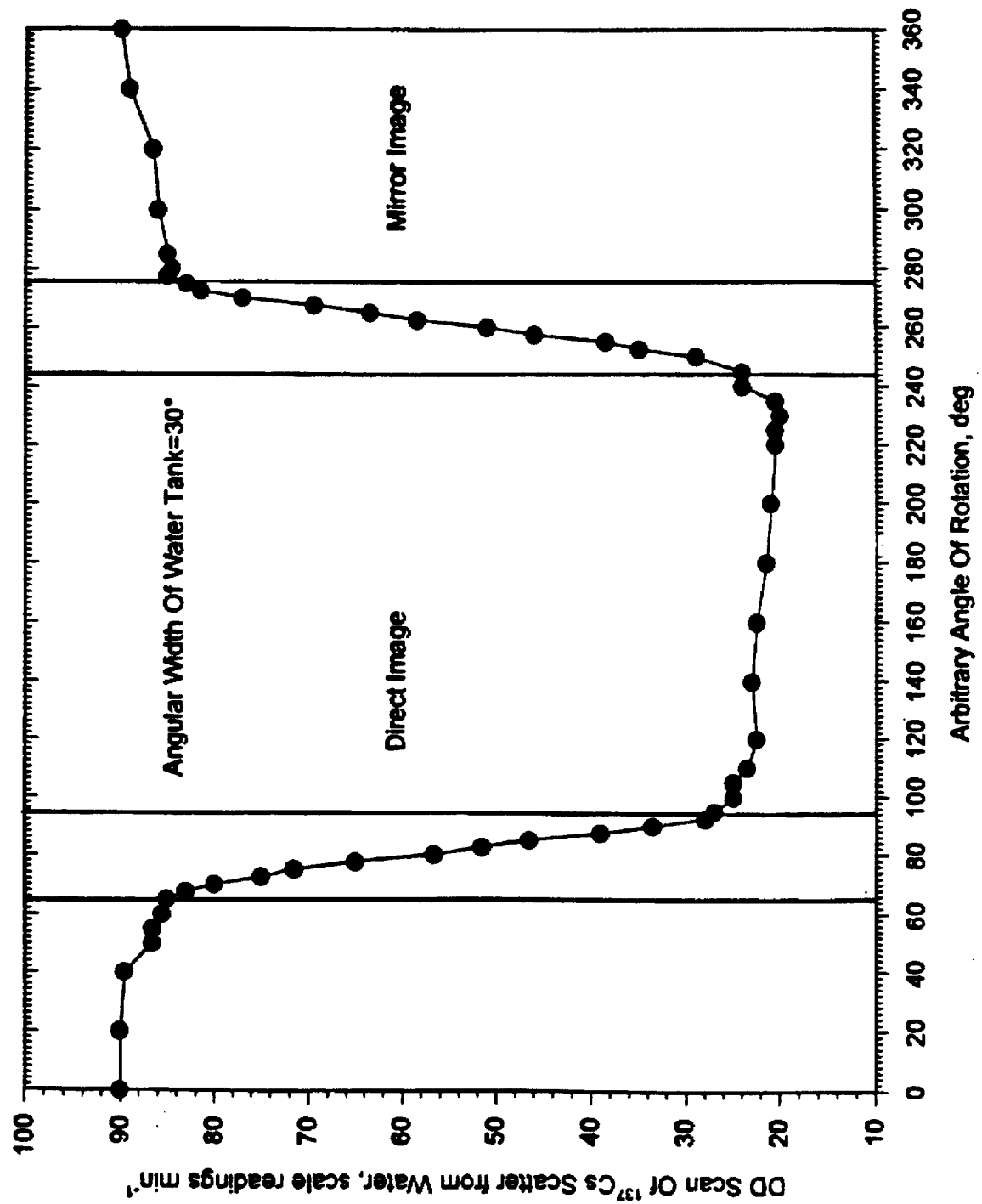
FIG. 6 is a graphical representation of scan data using the present invention for $^{137}$Cs gamma ray back-scatter from a polyethylene container of water (The direct and mirror images of the container are indicated by the vertical boundary lines. It can be seen that the radiation scatter pattern, representing the angular width of the container is 30°).

FIG. 5 is an illustration of another experimental setup for a scan of back-scattered $^{137}$Cs gamma rays from polyethylene container of water using the present invention and FIG. 6 is a graphical representation of scan data using the present invention for $^{137}$Cs gamma ray back-scatter from a polyethylene container of water. The direct and mirror images of the container are indicated by the vertical boundary lines. It can be seen that the radiation scatter pattern, representing the angular width of the container is 30°. The detector response in units of scale readings versus angle of rotation for a 360° scan of the cesium photon back-scatter from the container of water is shown in FIG. 6. The scatter intensity at the detector was 1.8 µGy(T) min$^{-1}$.

The transition region of the direct image starts at an angle of 65° and terminates at an angle of 92.5°. The vertical boundary lines identify this region in FIG. 6. The angle subtended at the detector is the difference of these two angles, namely, 30°. The value of this angle as calculated from the ruler measurements of distances is 29.9°.

The mirror image is 180° out of phase with the direct image but must also yield the same subtended angle for the tank of water. The scan curve in FIG. 6 indicates that the transition region of the mirror image starts at an angle of 245° and ends at an angle of 275°, that is, the subtended angle is again 30° in exact agreement with the direct image value.

Therefore, it is shown by these experiments that the present invention is a sensor that can be used to measure the angular differential dose or dose rate of incident gamma rays or x-rays on a target, consequently, a new, useful and practical quantity is now available to the radiation effects and medical communities. In addition the device is also capable of locating radiation sources at very low dose rates. Calibration results indicate that the present invention described above has a sensitivity of 208 nGy per scale unit for $^{137}$Cs gamma rays of 662 keV energy.

Although the present invention has been described with regard to one specific embodiment as to how to fabricate the present invention, those skilled in the art will readily recognize that other variations on the design of the present invention. Accordingly, the inventors do not wish to be limited by the present specification, but only by the appended claims.

Moreover, the present invention has been primarily described in terms as having a primary application in stereotactic radiosurgery; however, the present invention would be useful in a myriad of other applications.

For example, with the advent of astronauts remaining in space for long periods of time, it obviously would be advantageous to monitor personnel exposures to radiation. The concept of angular differential dose is important in the accurate determination of the dose and the direction from which it is being delivered to the astronaut. A practical case is to warn the astronaut of a particular dangerous direction of incoming radiation and thereby allow corrective action by personnel inside or outside the space craft. The directional dosimeter described herein will be an important, cost-effective sensor for this application of personnel protection in space.

Another example of an application for the present invention would be in solid state devices that consist of materials with different atomic numbers. In these devices, the dependence of effects on the direction of incident radiation, in particular gamma and x-rays, can be significant due to photo-Compton electrons and their distribution at interfaces of dissimilar materials. Thus, in the characterization of semiconductor devices for use in a radiation environment, the dose delivered at some angle of incidence is an important parameter in specifying the device's capability of survival and performance in an electronic circuit or system design. The concept of angular differential dose or dose rate and its measurement by the directional dosimeter described herein is important in this field of semiconductor research and application.

Of course, these are simply two more examples of applications for the present invention and there are hundreds more.

What is claimed is:

1. A directional dosimeter comprising:
   an electrometer dosimeter disposed within an ionization chamber, the ionization chamber comprising a housing wherein the housing is lined with a high atomic material on one major surface thereof and wherein the housing is lined with a low atomic material on an opposing major surface thereof.

2. The directional dosimeter of claim 1 wherein the electrometer dosimeter is a carbon fiber type electrometer dosimeter.

3. The directional dosimeter of claim 1 wherein the ionization chamber is large enough so that the electrometer dosimeter is operable from intensities of 100 nGy(T) h$^{-1}$ to 10$^4$ Gy(T) h$^{-1}$.

4. The directional dosimeter of claim 1 wherein at least one capacitor is connected in parallel between the electrometer dosimeter and ground.

5. The directional dosimeter of claim 1 wherein the high atomic number material is lead and wherein the low atomic number material is an organic material.

6. The directional dosimeter of claim 5 wherein the housing is made of plastic and the low atomic number material is carbon.

7. The directional dosimeter of claim 6 wherein the low atomic number material is carbon paint.

8. An apparatus for determining the angular differential dose of ionizing radiation comprising:
   a dosimeter having an element from which the ionizing effects of radiation are measured, wherein the element provides an analog or digital account of the dose of radiation;
   a body of high atomic material disposed along one major surface of the element;
   a body of low atomic material disposed along an opposing major surface of the element;
   means to calculate the dose as a function of:

$$D = \int_{\phi=0}^{2\pi} \int_{\Theta=0}^{\pi} D_{\phi\Theta}(\phi\Theta) d\phi d\Theta$$

where D is the dose in gray and where the units of $D_{\phi\Theta}(\phi\Theta)$ are gray per steradian and where $\phi$ and $\Theta$ represent radian angles of a sphere.

9. The apparatus of claim 8 wherein the dosimeter is an electrometer dosimeter disposed within an ionization chamber, wherein the ionization chamber is the element and comprises a housing.

10. The apparatus of claim 9 wherein the electrometer dosimeter is a carbon fiber type electrometer dosimeter.

11. The apparatus of claim 9 wherein the ionization chamber is large enough so that the electrometer dosimeter is operable from intensities of 100 nGy(T) h$^{-1}$ to 10$^4$ Gy(T) h$^{-1}$.

12. The apparatus of claim 9 wherein at least one capacitor is connected in parallel between the electrometer dosimeter and ground.

13. The apparatus of claim 8 wherein the high atomic number material is lead and wherein the low atomic number material is an organic material.

14. The apparatus of claim 9 wherein the housing is made of plastic and the low atomic number material is carbon.

15. The apparatus of claim 14 wherein the low atomic number material is a carbon paint.

16. A method for determining the angular differential dose of ionizing radiation comprising the steps of:
   providing a dosimeter having an element from which the ionizing effects of radiation are measured, wherein the element provides an analog or digital account of the dose of radiation;
   coupling a body of high atomic material to one major surface of the element;
   coupling a body of low atomic material to an opposing major surface of the element;
   calculating the dose as a function of:

$$D = \int_{\phi=0}^{2\pi} \int_{\Theta=0}^{\pi} D_{\phi\Theta}(\phi\Theta) d\phi d\Theta$$

where D is the dose in gray and where the units of $D_{\phi\Theta}(\phi\Theta)$ are gray per steradian and where $\phi$ and $\Theta$ represent angles in spherical coordinates.

* * * * *